United States Patent [19]

Norling et al.

[11] Patent Number: 4,766,768
[45] Date of Patent: Aug. 30, 1988

[54] ACCELEROMETER WITH ISOLATOR FOR COMMON MODE INPUTS

[75] Inventors: Brian L. Norling, Mill Creek; Craig J. Cornelius, Redmond, both of Wash.

[73] Assignee: Sundstrand Data Control, Inc., Redmond, Wash.

[21] Appl. No.: 111,984

[22] Filed: Oct. 22, 1987

[51] Int. Cl.⁴ ............................................. G01P 15/10
[52] U.S. Cl. ................................... 73/497; 73/517 AV
[58] Field of Search .............. 73/517 AV, 517 R, 497; 310/329, 346

[56] References Cited

U.S. PATENT DOCUMENTS

| | | | |
|---|---|---|---|
| 4,221,131 | 9/1980 | Albert | 73/517 AV |
| 4,517,841 | 5/1985 | Peters et al. | 73/517 AV |
| 4,658,174 | 4/1987 | Albert | 73/517 AV |
| 4,718,275 | 1/1988 | Norling | 73/517 AV |

Primary Examiner—John Chapman
Attorney, Agent, or Firm—Christensen, O'Connor, Johnson & Kindness

[57] ABSTRACT

An accelerometer comprising a support (52) and a proof mass (40) mounted to the support by a flexure (50) or the like, such that the proof mass can rotate about a hinge axis (HA) perpendicular to sensitive axis (SA). An isolator (42) is also mounted to the support by an isolator suspension system (60, 62) that is relatively compliant for isolator movement parallel to a transducer axis (TA) normal to the hinge axis, and relatively noncompliant for isolator rotation about the hinge axis. Force transducers (80, 82) are connected between the isolator and the proof mass. The force transducers are parallel to the transducer axis, and positioned on opposite sides of the hinge axis from one another, such that rotation of the proof mass about the hinge axis puts one force transducer in tension and the other force transducer in compression. The isolator suspension system reduces the magnitude of common mode inputs, such as those caused by differential thermal expansion of the crystals with respect to other accelerometer components.

14 Claims, 5 Drawing Sheets

ACCELEROMETER WITH ISOLATOR FOR COMMON MODE INPUTS

TECHNICAL FIELD OF THE INVENTION

The present invention relates to accelerometers and, in particular, to an accelerometer in which movement of a proof mass is constrained by force transducers.

BACKGROUND OF THE INVENTION

In a vibrating beam accelerometer, a proof mass is mounted to a support by a flexure hinge or the like, and a vibrating beam force transducer is connected along the accelerometer's sensitive axis between the proof mass and the support. An acceleration along the sensitive axis results in a compression or tension force on the force transducer. This force is converted into an electrical signal that indicates both the direction and magnitude of the acceleration. A well-known type of vibrating beam force transducer comprises a quartz crystal arranged as a double-ended tuning fork. The double-ended tuning fork includes a pair of side-by-side beams that are caused to vibrate in a transverse oscillation mode in which the two beams move in their common plane 180° out of phase with one another. Tension or compression forces on the force transducer result in an increase or decrease respectively of the vibration frequency.

Vibrating beam accelerometers possess a number of significant advantages, including excellent scale factor stability. Many error sources in such accelerometers can be greatly reduced by using two proof masses and two sensing crystals operated in a push-pull configuration, such that one crystal is put in compression while the other is put in tension. The output is treated as some function of the frequency difference. This method of measurement cancels out many common mode errors, including the contribution of force crystal nonlinearity to the vibration rectification coefficient. However, a disadvantage of using dual proof masses is that identity of the dynamic responses of the two accelerometers is difficult to achieve. To avoid these problems, it has previously been proposed to use a single proof mass in connection with a pair of force transducers, with the force transducers being connected to the proof mass in the push-pull mode in which one crystal is placed in tension and the other in compression for a given input acceleration. As with the dual proof mass approach, this arrangement may be used to cancel various common mode errors.

A primary source of common mode errors in most vibrating beam accelerometers is related to mismatched coefficients of thermal expansion. Crystalline quartz, in the crystalline axis orientation commonly used for force transducers, has a relatively nonlinear expansion coefficient as a function of temperature. It is extremely difficult to find metals with the proper qualities for flexures which also match the thermal expansion of crystalline quartz. Even if a perfect match were made at a given temperature, the nonlinearities of crystalline quartz expansion would cause mismatches to occur at the operating temperature extremes. Furthermore, it is common for the zero stress point of crystal attachment to be at a temperature substantially above the accelerometer operating range. This is typical for epoxies, anodic bonding, brazing, and glass frit bonding. Thus the resulting accelerometer will have thermal expansion mismatch that will cause common mode stress on the crystals.

Residual stresses on the crystals and mechanism can cause many problems. These problems include high bond line stresses on the end attachment joint, stress on mechanical parts, and stress on crystals. The high bond line stress results in accelerated creep, higher strength requirements, and limitations on usable bonding technologies. Stress on mechanism parts results in reduced shock load capability, dimensional instability, and additional strength requirements. Stress on the crystals results in dimensional instabilities, reduced full range capability, changes in crystal operating points, higher temperature sensitivities, and differential mode errors due to unequal stiffness.

SUMMARY OF THE INVENTION

The present invention describes a technique for substantially reducing common mode loading of the force transducers while maintaining high stiffness to support differential mode acceleration inputs. This is accomplished through the use of an isolator and an isolator suspension means that is relatively compliant along a transducer axis parallel to the force transducers, but relatively noncompliant with respect to rotation about the proof mass hinge axis.

In a preferred embodiment, the accelerometer comprises a support, a proof mass, mounting means, an isolator, an isolator suspension system, and two force transducers. The mounting means mounts the proof mass to the support such that the proof mass can rotate about a hinge axis perpendicular to the sensitive axis. The isolator suspension system mounts the isolator to the support. The isolator suspension system is relatively compliant for isolator movement parallel to a transducer axis normal to the hinge axis, and relatively noncompliant for isolator rotation about the hinge axis. The force transducers are connected between the isolator and the proof mass. The force transducers are parallel to the transducer axis, and positioned on opposite sides of the hinge axis from one another, such that rotation of the proof mass about the hinge axis puts one force transducer in tension and the other force transducer in compression.

DETAILED DESCRIPTION OF THE INVENTION

Figure 1:
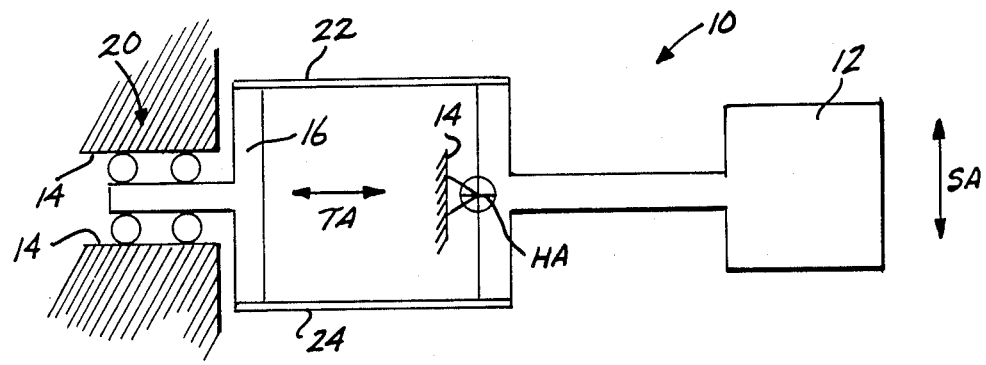
FIG. 1 is a schematic drawing showing one preferred embodiment of the accelerometer of the present invention.

One preferred embodiment of the accelerometer of the present invention is illustrated in schematic form in FIG. 1. The accelerometer 10 comprises proof mass 12 that is mounted to support 14 that the proof mass is rotatable about hinge axis HA that is normal to the plane of the drawing. The accelerometer further comprises isolator 16 that is mounted to different portion of support 14 by an isolator suspension system generally indicated by reference numeral 20. The isolator suspension system, symbolized by four rollers in FIG. 1, is compliant along a transducer axis TA that is perpendicular to sensitive axis SA and to hinge axis HA, and is noncompliant for rotation about hinge axis HA.

Force transducers 22 and 24 interconnect isolator 16 and proof mass 12. The force transducers are parallel to transducer axis TA, and are positioned on opposite sides of hinge axis HA from one another, such that rotation of proof mass 12 about hinge axis HA puts one force transducer in tension and the other force transducer in compression. Differential thermal expansion or contraction of force transducers 22 and 24 with respect to other components of the accelerometer results in movement of isolator 16 along transducer axis TA, but ideally produces no stresses on the force transducers, and therefore does not result in errors in the accelerometer output. In a practical system in which the isolator suspension system has some small resistance to isolator movement along the transducer axis, the resulting small forces on the force transducers produce common mode inputs that are substantially cancelled by the push-pull arrangement of the transducers.

Figure 2:
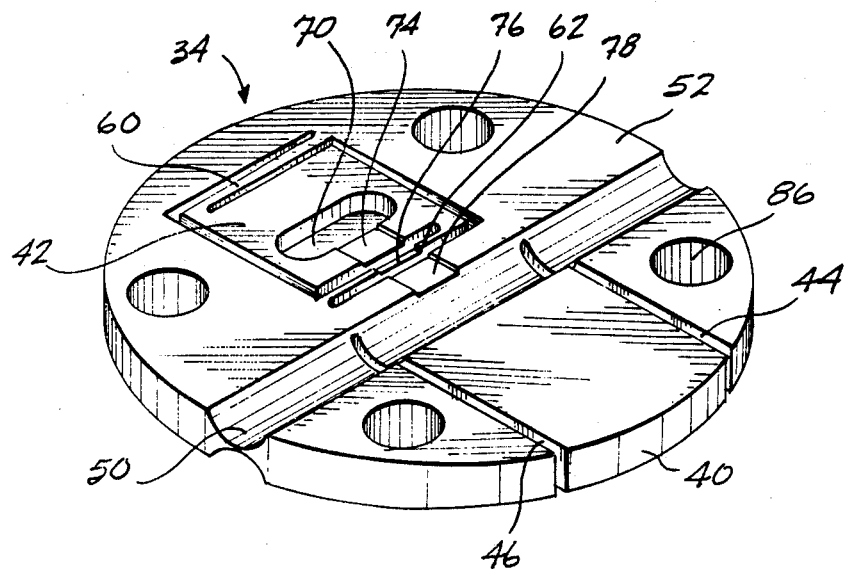
FIG. 2 is a perspective view of a proof mass assembly for an embodiment corresponding to FIG. 1.
Figure 3:
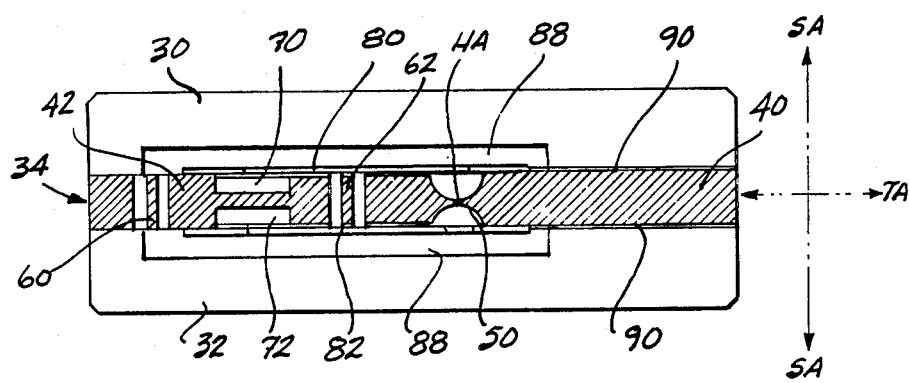
FIG. 3 is a cross-sectional view of an accelerometer corresponding to the proof mass assembly of FIG. 2.
Figure 4:
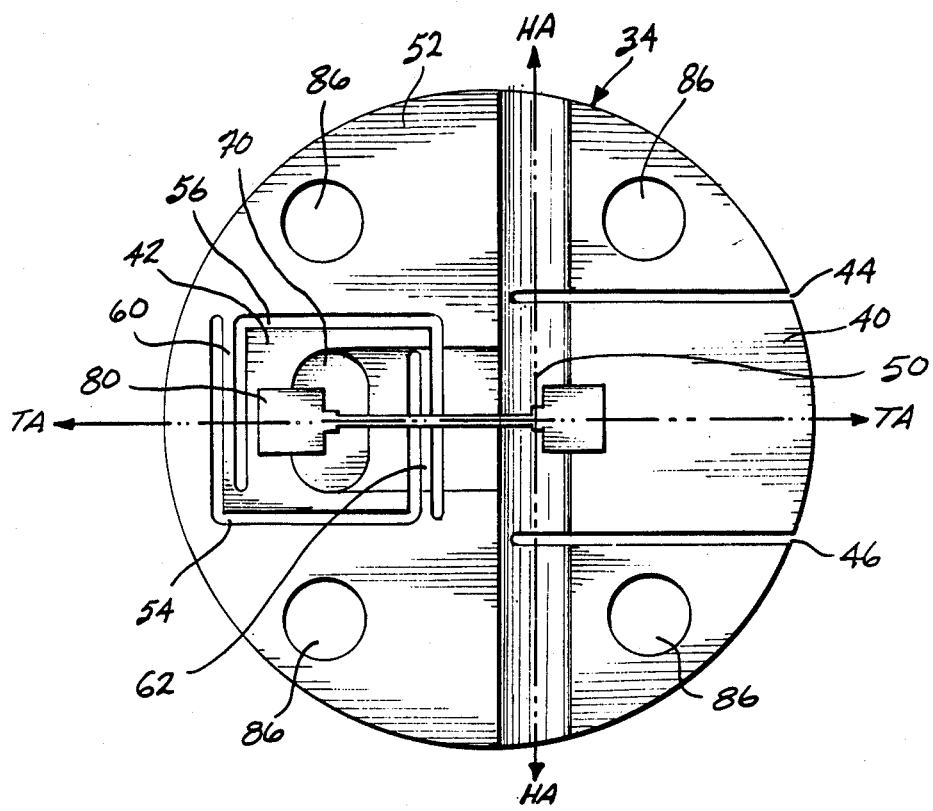
FIG. 4 is a top plan view of the proof mass assembly of FIG. 2 and one of the force crystals.

An actual embodiment corresponding to the schematic embodiment shown in FIG. 1 is illustrated in FIGS. 2-4. This embodiment includes upper and lower plates 30 and 32 (FIG. 3) between which proof mass assembly 34 is sandwiched. Proof mass assembly 34 comprises a cylindrical wafer in which proof mass 40 and isolator 42 are formed. Force sensing crystals 80 and 82 are attached to the upper and lower surfaces respectively of the proof mass assembly, as described more fully below. Proof mass 40 is formed by cutting parallel slots 44 and 46 through the wafer, and by forming a pair of aligned, semicircular cutouts in the upper and lower surfaces of the wafer, to form circular arc flexure 50 between proof mass 40 and the remaining body of the proof mass assembly, hereafter designated as support 52. The orientation of the hinge axis is such that it is perpendicular to slots 44 and 46 that define the sides of proof mass 40.

Isolator 42 is formed by making a pair of interlocking C-shaped slots 54 and 56, the slots resulting in the formation of isolator 42 connected to support 52 by beams 60 and 62. The sizes and positions of slots 54 and 56 are adjusted such that beams 60 and 62 have comparatively small dimensions along a transducer axis TA, and comparatively large dimensions along the hinge axis and sensitive axis. As a result, isolator 42 is relatively compliant for translational motion along the transducer axis, and is comparatively noncompliant for other degrees of freedom, including rotation about hinge axis HA. The upper and lower surfaces of isolator 42 include cutout sections 70 and 72 that are provided to reduce the mass of the isolator, for reasons discussed below. As best shown in FIG. 2, the upper surfaces of isolator 42, beam 62 and support 52 include recessed areas 74, 76 and 78, respectively, and the lower surfaces of the corresponding elements include similar recessed sections. These recessed sections permit attachment of force sensing crystals 80 and 82 between isolator 42 and proof mass 40.

Upper support 30, proof mass assembly 34 and lower support 32 are fastened together by four screws (not shown) that pass through openings (not shown) in the upper and lower plates, and through openings 86 in support 52. The upper and lower plates include recessed areas 88 above and below the force sensing crystals, to accommodate the crystals and the lead wires connected thereto. The crystals could also be mounted on pedestals, or recessed into the proof mass assembly to adjust scaling and natural frequency. The portions of the upper and lower plates adjacent to proof mass 40 may be machined such that these surfaces are set slightly back from the proof mass, to provide suitable shock clearances at interfaces 90 between the proof mass and the adjacent surfaces of the upper and lower plates.

In operation, force sensing crystals 80 and 82 are connected to a pair of drive circuits that provide output signals at the respective crystal vibration frequencies. The output signals may then be processed in a manner well known to those skilled in the art, to provide a measure of acceleration along sensitive axis SA. The processing may be accomplished in a manner similar to that shown in U.S. Pat. No. 4,467,651, hereby incorporated by reference. The isolator design shown in FIGS. 2-4 provides a 10:1 reduction in the common mode loading on the crystals for any given input acceleration. This is accomplished with less than one percent drop in the proof mass resonant frequency. In this embodiment, as well as with the embodiments describe below, the perpendicular distances between the force sensing crystals and the hinge axis are preferably identical to one another, such that a given acceleration input produces equal and opposite forces on the force sensing crystals.

Figure 5A:
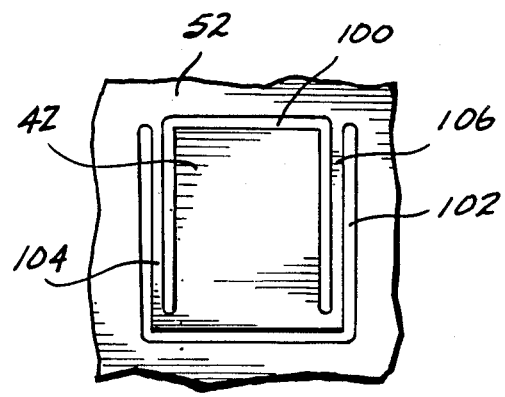
FIGS. 5A-5C are schematic illustrations of alternate isolator suspension systems.
Figure 5B:
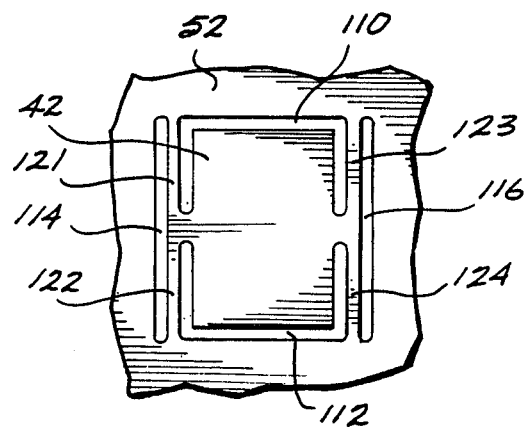
Figure 5C:
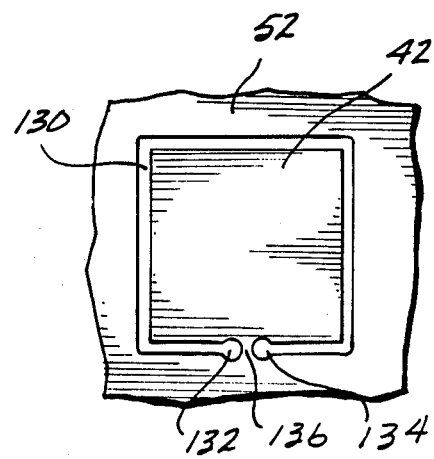

The isolation system for isolator 42 may take any form, so long as it provides for relatively high compliance for translation along transducer axis TA, and relatively low compliance for rotation about hinge axis HA. In addition, all isolator resonant frequencies are preferably kept well above the 2000 Hz maximum input vibration frequency. Three alternate isolator suspension systems are illustrated in FIGS. 5A-5C. In these figures, similar reference numerals 42 and 52 are used for the isolator and support, respectively. In FIG. 5A, isolator 42 is formed by a pair of opposed, nested C-shaped slots 100 and 102, thereby forming a pair of beams 104 and 106. In FIG. 5B, isolator 42 is formed by a pair of opposed C-shaped slots 110 and 112, and a pair of linear slots 114 and 116, thereby forming a suspension system comprising beams 121-124. An advantage of the arrangement of FIG. 5B is that it produces pure straight line motion of the isolator along the transducer axis. A disadvantage is that it involves more cuts (slots) than the embodiments shown in FIGS. 4 and 5A. Another arrangement for the isolator suspension system is shown in FIG. 5C. In this embodiment, a single slot 130 forms a nearly continuous rectangle, and enlarged ends 132 and 134 form a flexure 136.

Figure 6:
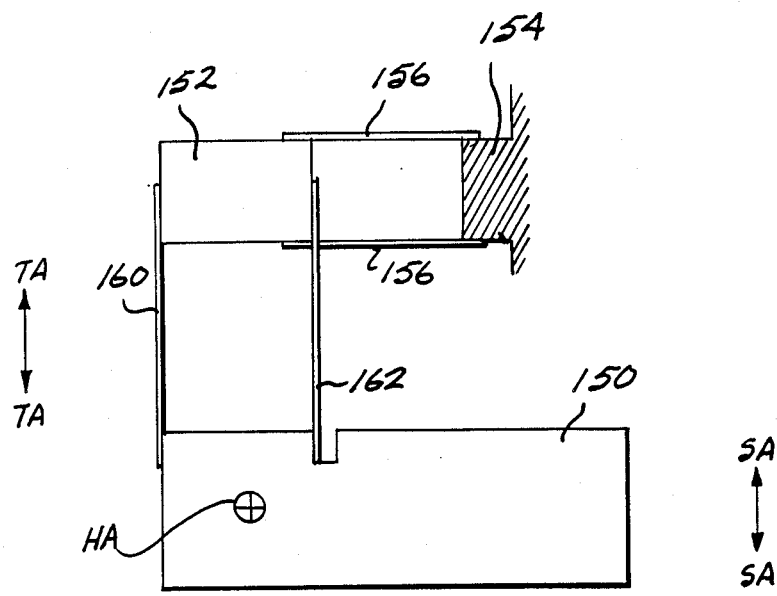
FIG. 6 is a schematic view of a second preferred embodiment of the invention.

A second embodiment of the accelerometer of the present invention is illustrated schematically in FIG. 6. In this embodiment, proof mass 150 is mounted to a support by suitable means (not shown) such that the proof mass can rotate about hinge axis HA that is normal to the plane of the drawing in FIG. 6. Isolator 152 is mounted to support 154 by an isolator suspension system illustrated as a pair of flexures 156, such that isolator 152 is relatively compliant for translational movement along a transducer axis TA that for this embodiment is parallel to sensitive axis SA. However, flexures 156 prevent rotation of isolator 152 about hinge axis HA. A pair of force sensing crystals 160 and 162 extend between proof mass 150 and isolator 152, parallel to transducer axis TA. As with the prior embodiments, acceleration along sensitive axis SA tends to rotate proof mass 150 about hinge axis HA, thereby putting one force sensing crystal in tension and the other force sensing crystal in compression. However, differential thermal expansion or contraction of the force sensing crystals with respect to the other accelerometer components causes translational movement of isolator 152 along transducer axis TA. Because of the high compliance of the isolator along the transducer axis, differential thermal expansion causes a relatively small common mode force on the crystals.

Figure 7:
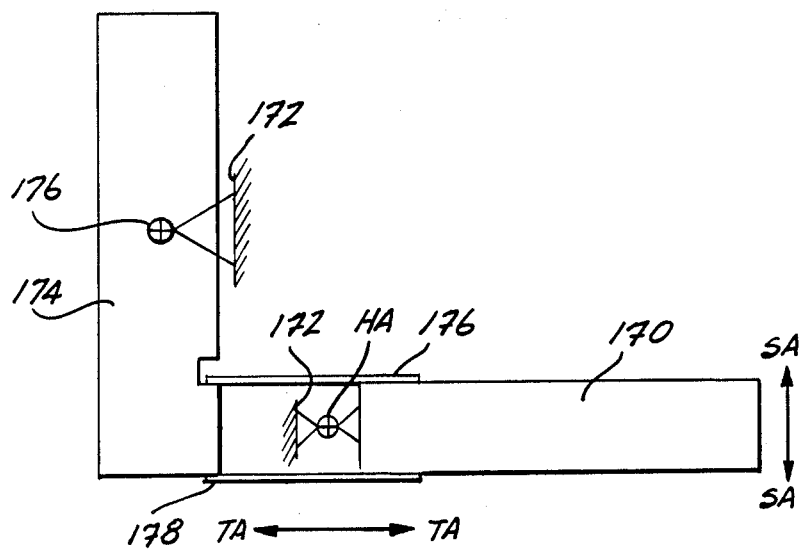
FIG. 7 is a schematic view of a third preferred embodiment of the present invention.

A third embodiment of the invention is illustrated schematically in FIG. 7. In this embodiment, proof mass 170 is mounted to support 172 by suitable means, such that the proof mass is rotatable about hinge axis HA. Isolator 174 is also mounted to support 172 by suitable means, such that the isolator is rotatable about pivot axis 176 that is parallel to hinge axis HA, but displaced therefrom in a direction normal to the hinge axis, such that the isolator cannot rotate about the hinge axis. Pivot axis 176 preferably passes through the center of mass of isolator 174, such that the isolator does not tend to rotate in response to acceleration inputs. Force sensing crystals 176 and 178 extend along transducer axis TA between proof mass 170 and isolator 174, on opposite sides of hinge axis HA. Transducer axis TA is perpendicular to both the hinge axis and to sensitive axis SA. As with prior embodiments, acceleration along sensitive axis SA tends to rotate proof mass 170 about hinge axis HA, thereby putting one force sensing crystal in tension and the other in compression. On the other hand, differential thermal expansion of the force sensing crystals tends to rotate isolator 174 about pivot axis 176, producing a small common mode force on the crystals.

In the embodiment shown in FIGS. 2-4, the mass of isolator 42 and the nonlinearities in the crystals lead to a slight cross axis acceleration sensitivity, even though the loading is common mode. One way to reduce this error source is to reduce the mass of the isolator as much as possible, such as by means of recesses 70 and 72. Another option is to use an accelerometer such as the one shown in FIG. 6, wherein the mass of isolator 152 adds common mode loading only due to sensitive axis acceleration. In this case, the error is removed by the calibration process for the accelerometer. Another option is to use an accelerometer such as the one shown in FIG. 7, wherein isolator 174 is supported at its center of mass, so that it is uneffected by linear acceleration.

Figure 8:
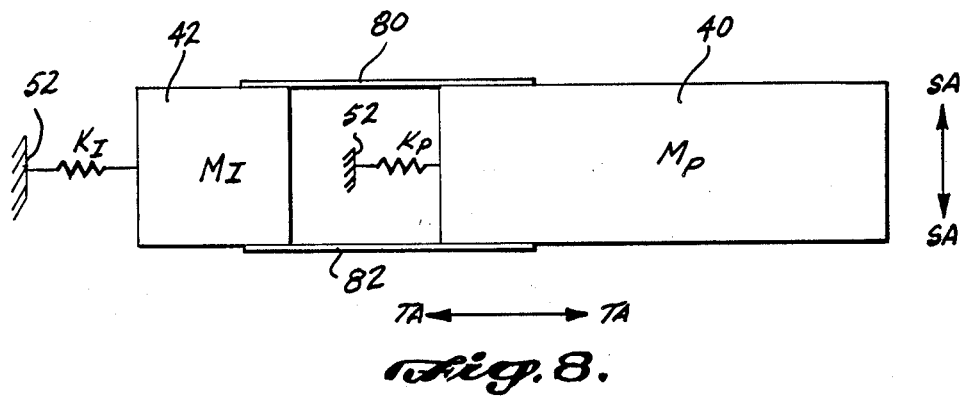
FIGS. 8 and 9 are schematic views of the accelerometer of FIGS. 2-4.

Another approach to the isolator mass problem is schematically illustrated in FIG. 8, wherein the reference numerals of FIGS. 2-4 are used again for convenience. $M_P$ and $M_I$ represent the masses of the proof mass and isolator, respectively. $K_P$ represents the spring constant for flexure 50 for translational movement of the proof mass along the transducer axis with respect to the support. Similarly, $K_I$ represents the spring constant of the isolator suspension system, again for motion along the transducer axis with respect to the support. If the ratio $M_P/K_P$ is made equal to $M_I/K_I$, then the cross axis sensitivity will go to zero. In general, the preferred way of achieving this equality is to make $M_I$ much smaller than $M_P$, and $K_I$ much smaller than $K_P$ by the same factor.

The connection of two vibrating beam force transducers to a single proof mass introduces a potential problem of crosstalk between the transducers. Thus for some designs, it will be preferable to use force sensing crystals that have center frequencies that are spaced far enough apart so that the frequency operating ranges of the crystals do not overlap. The use of crystals having different center frequencies can mean that the stiffnesses of the crystals will be different from one another, and that the forces sensed by the crystals for a given acceleration input will be different from one another. This difference in the magnitudes of the sensed forces will in general lead to an increase in the vibration rectification coefficient, especially during the maximal proof mass excursions that accompany inputs at the fundamental system resonance, i.e., at the resonant frequency for vibration of the proof mass about the hinge axis with the isolator stationary.

Another condition that will result in unequal forces being sensed by the crystals is if they are mounted at unequal perpendicular distances from the hinge axis, HA. This inequality can be a result of variations in the process used to attach the crystals to the mechanism and/or dimensional variations in the mechanism proper. These unequal mounting distances also increase the vibration rectification coefficient.

Figure 9:
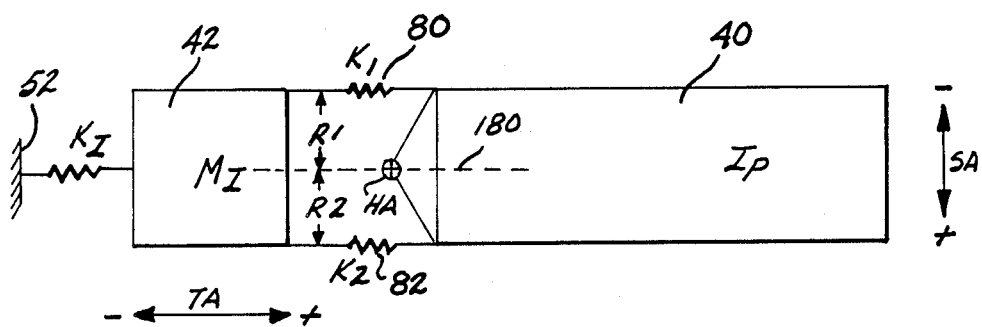

The use of any isolator that can move along the transducer axis provides a means for reducing the vibration rectification coefficient, and this reduction can be maximized by the proper selection of the isolator stiffness along the transducer axis. A simplified model for the accelerometer of FIGS. 2-4 is presented in FIG. 9. The model of FIG. 9 includes proof mass 40 having moment of inertia $I_P$ and about hinge axis HA, isolator 42 having mass $M_I$, and isolation suspension system 20 that has a spring constant $K_I$ along transducer axis TA. The isolator and proof mass are interconnected by force sensing crystals 80 and 82 that have spring constants $K_1$ and $K_2$ respectively, and are positioned at perpendicular distances $R_1$ and $R_2$ from centerline 180 that passes through hinge axis HA and is perpendicular to transducer axis TA. The system shown in FIG. 9 can be thought of as a two degree of freedom system whose motions consist of proof mass rotation about the hinge axis and translation of the isolator along the transducer axis. For the present discussion, it will be assumed that the positive direction for proof mass rotation is clockwise, and that the positive direction for isolator movement is to the right.

In general, the forces $F_1$ and $F_2$ experienced by the respective force sensing crystals are given by $$F_1 = K_1(\theta \cdot R_1 - Z) \quad (1)$$

$$F_2 = -K_2(\theta \cdot R_2 + Z) \quad (2)$$

where $\theta$ is the angle of rotation of the proof mass about the hinge axis, Z is the distance of movement of the isolator along the transducer axis, and where it is assumed that a tension force is positive and a compression force is negative. Ideally, forces $F_1$ and $F_2$ are equal for any given acceleration input, i.e., for any given rotation of proof mass 40. However in general, $F_1$ and $F_2$ will be unequal due to differences between $K_1$ and $K_2$ and/or differences between $R_1$ and $R_2$. It has been found, however, that for the two degree of freedom model of FIG. 9, the maximal differences between the forces experienced by the crystals during resonant proof mass excursions can be minimized by adjustment of spring constant $K_I$, such that $$K_I = \frac{M_I}{I_P} K_1 R_1^2 + K_2 R_2^2 \qquad (3)$$

The value of $K_I$ determined by Equation (3) is the tuned condition at which the resonant frequency of the isolator mass and isolator suspension system absent crystals 80 and 82 is the same as the fundamental system resonance, i.e., the resonant frequency of the proof mass and the force sensing crystals, assuming no isolator movement. In the tuned condition, isolator movement will tend to reduce the force differences between the crystals, and will therefore improve the vibration rectification coefficient. The isolator suspension system is therefore preferably designed such that $K_I$ satisfies Equation (3), particularly for systems in which crystals having different center frequencies are used.

While the preferred embodiments of the invention have been illustrated and described, variations will be apparent to those skilled in the art. The scope of the invention is therefore not limited to the described embodiments, but is to be determined by reference to the following claims.

The embodiments of the invention in which an exclusive property or privilege is claimed are defined as follows:

1. An accelerometer for measuring acceleration along a sensitive axis, the accelerometer comprising:
   a support;
   a proof mass;
   mounting means for mounting the proof mass to the support such that the proof mass can rotate about a hinge axis perpendicular to the sensitive axis;
   an isolator;
   isolator suspension means for mounting the isolator to the support, the isolation suspension means being relatively compliant for isolator movement parallel to a transducer axis normal to the hinge axis and relatively noncompliant for isolator rotation about the hinge axis; and
   two force transducers connected between the isolator and the proof mass, the force transducers being parallel to the transducer axis, and positioned on opposite sides of the hinge axis from one another such that rotation of the proof mass about the hinge axis puts one force transducer in tension and the other force transducer in compression.

2. The accelerometer of claim 1, wherein the transducer axis is normal to the sensitive axis.

3. The accelerometer of claim 2, wherein the isolator suspension means is relatively compliant for rotation of the isolator about a pivot axis parallel to the hinge axis, but spaced from the hinge axis in a direction normal to the hinge axis.

4. The accelerometer of claim 1, wherein the transducer axis is parallel to the sensitive axis.

5. The accelerometer of claim 1, wherein the isolator suspension means comprises first and second beams positioned on opposite sides of the isolator along the transducer axis, each beam extending in a direction parallel to the hinge axis, each beam being connected to the support and to the isolator, each beam being relatively compliant for bending along the transducer axis and relatively noncompliant for bending along the sensitive axis.

6. The accelerometer of claim 1, wherein the mounting means comprises a circular arc flexure.

7. The accelerometer of claim 1, wherein the perpendicular distance between each force transducer and the hinge axis is equal to the perpendicular distance between the other force transducer and the hinge axis.

8. The accelerometer of claim 1, wherein the mass of the proof mass divided by the compliance of the mounting means along the transducer axis is equal to the mass of the isolator divided by the compliance of the isolator suspension means along the transducer axis.

9. The accelerometer of claim 1, wherein the spring constant of the isolator suspension means for isolator movement along the transducer axis is selected such that the resonant frequency for isolator vibration along the transducer axis independently of the force transducers and proof mass is substantially equal to the resonant frequency for proof mass vibration about the hinge axis with the isolator held stationary.

10. An accelerometer for measuring acceleration along a sensitive axis, the accelerometer comprising:
    an upper plate member;
    a lower plate member;
    a proof mass assembly sandwiched between the upper and lower plates, the proof mass assembly including a support connected to the upper and lower plates, a proof mass, mounting means for mounting the proof mass to the support such that the proof mass can rotate about a hinge axis perpendicular to the sensitive axis, an isolator, and isolator suspension means for mounting the isolator to the support, the isolator suspension means being relatively compliant for isolator movement parallel to a transducer axis normal to the hinge axis, and relatively noncompliant for isolator rotation about the hinge axis; and
    two force transducers connected between the isolator and the proof mass, the force transducers being parallel to the transducer axis and positioned on opposite sides of the hinge axis from one another, such that rotation of the proof mass about the hinge axis puts one force transducer in tension and the other force transducer in compression.

11. The accelerometer of claim 10, wherein the mounting means comprises a circular arc flexure.

12. The accelerometer of claim 10, wherein the perpendicular distance between each force transducer and the hinge axis is equal to the perpendicular distance between the other force transducer and the hinge axis.

13. The accelerometer of claim 10, wherein the mass of the proof mass divided by the compliance of the mounting means along the transducer axis is equal to the mass of the isolator divided by the compliance of the isolator suspension means along the transducer axis.

14. The accelerometer of claim 10, wherein the spring constant of the isolator suspension means for isolator movement along the transducer axis is selected such that the resonant frequency for isolator vibration along the transducer axis independently of the force transducers and proof mass is substantially equal to the resonant frequency for proof mass vibration about the hinge axis with the isolator held stationary.

* * * * *